United States Patent
Frederiks et al.

(10) Patent No.: US 7,609,724 B1
(45) Date of Patent: Oct. 27, 2009

(54) ENHANCED FRAME AGGREGATION IN A WIRELESS NETWORK SYSTEM

(75) Inventors: Guido Robert Frederiks, Monte Sereno, CA (US); Vincent K. Jones, Redwood City, CA (US); Alireza Raissinia, Monte Sereno, CA (US)

(73) Assignee: Qualcomm Incorporated, San Diego, CA (US)

( * ) Notice: Subject to any disclaimer, the term of this patent is extended or adjusted under 35 U.S.C. 154(b) by 515 days.

(21) Appl. No.: 11/413,953

(22) Filed: Apr. 28, 2006

Related U.S. Application Data (60) Provisional application No. 60/676,038, filed on Apr. 29, 2005.

(51) Int. Cl.
*H04J 3/24* (2006.01)
*H04L 12/26* (2006.01)

(52) U.S. Cl. ...................... 370/473; 370/252
(58) Field of Classification Search ................. 370/473, 370/252
See application file for complete search history.

(56) References Cited

U.S. PATENT DOCUMENTS

| | | | |
|---|---|---|---|
| 6,954,891 B1 * | 10/2005 | Jha | 714/776 |
| 2005/0068900 A1 * | 3/2005 | Stephens et al. | 370/252 |
| 2005/0071583 A1 * | 3/2005 | Shepherd | 711/154 |
| 2005/0091413 A1 * | 4/2005 | Walbeck et al. | 709/251 |
| 2005/0220145 A1 * | 10/2005 | Nishibayashi et al. | 370/389 |
| 2006/0140172 A1 * | 6/2006 | Trainin | 370/352 |

OTHER PUBLICATIONS

ANSI/IEEE Std. 802.11, 1999 Edition; pp. 34-41.
Mutjaba, "Periodic Multi-Receiver Aggregation", Powerpoint presentation, Agere Systems, Mar. 2005 downloaded from the internet at http://www.ieee802.org/11/DocFiles/05/11-05-0193-01-000n-tgnsync-additional-material.ppt on Aug. 21, 2006. pp. 10-14.

* cited by examiner

*Primary Examiner*—Derrick W Ferris
*Assistant Examiner*—Angel Brockman
(74) *Attorney, Agent, or Firm*—Turocy & Watson, LLP (57) ABSTRACT

Variable-length information-containing frames (e.g., MPDUs) are aggregated into a bitstream using frame delimiters to distinguish the frames. Aggregation and frame extraction techniques are provided that support recovery from bit errors that may be present in a frame delimiter. One class of techniques involves providing redundant length information in the frame delimiters, e.g., by using multiple copies of a length field or error correction codes usable to correct errors in the length field. The receiver can use the redundant information to detect and correct errors in the length field. Another receiver-side technique iteratively attempts to locate the end of the corresponding frame when a corrupt frame delimiter is detected. Conventional synchronization fields may be eliminated.

14 Claims, 5 Drawing Sheets

ENHANCED FRAME AGGREGATION IN A WIRELESS NETWORK SYSTEM

CROSS-REFERENCES TO RELATED APPLICATIONS

This application claims the benefit of U.S. Provisional Application No. 60/676,038, filed Apr. 29, 2005, entitled "Improved Protocols for MPDU Aggregation in a Wireless Network System," which disclosure is incorporated herein by reference for all purposes.

BACKGROUND OF THE INVENTION

The present invention relates in general to wireless networking systems and in particular to enhanced techniques for handling aggregated frames in a wireless networking system to improve throughput in the presence of bit errors.

Wireless networks continue to grow in popularity, and various standards for wireless networks (e.g., the IEEE 802.11 family of standards, which now includes 802.11a, 802.11b, 802.11c, 802.11g) are available. Such standards facilitate network setup and interoperability of devices made by different manufacturers. As use of these networks increases, the demand for bandwidth increases, and protocols are continually evolving to meet this demand.

The bandwidth required for or used by a particular network depends on the amount of data to be transferred via the network and the overhead associated with transferring that data. Overhead comes from various sources, including addressing and error-checking information, control information, as well as retransmission of corrupted information (i.e., information that the receiver was unable to interpret or rely on due to detected bit errors). As overhead increases, throughput of data decreases, making the network less efficient.

One approach to increasing data throughput is to increase the bit rate in the data streams being transmitted. Increasing the bit rate, however, can result in little or no increase in throughput. This is because, to the extent that increasing the bit rate also increases the bit error rate, an increasing fraction of the available bandwidth must be used to retransmit corrupted information.

An alternative approach is to improve the protocol efficiency, so that more of the available bandwidth can be used for data transmission rather than overhead associated with the protocol. One approach that is under consideration for future IEEE 802.11 standards is aggregation of data frames at the medium access (MAC) layer.

As is generally known, existing 802.11 standards specify that data to be transmitted is organized into frames referred to as MAC protocol data units (MPDUs). Each MPDU includes a header with address and control information, a body containing the data to be transmitted, and a frame check sequence (FCS) field that includes a checksum, which the receiver can use to detect bit errors in the frame. When errors are detected, the receiver can request retransmission of the MPDU. The MPDU header size is fixed, but the amount of data in an MPDU (and therefore the length of the MPDU) can vary, up to a maximum specified in the standard.

When the physical (PHY) layer transmits individual MPDUs, it adds additional overhead bits to each MPDU. One way to reduce this overhead is to aggregate multiple MPDUs into a single unit, referred to as a PHY layer service data unit (PSDU). Since MPDUs generally do not have a uniform length, it is necessary to include delimiters that the receiver can use to identify the beginning and end of each MPDU. As long as the delimiters are sufficiently short, the overhead introduced by delimiters is less than the overhead associated with transmitting each MPDU separately.

Figure 1:
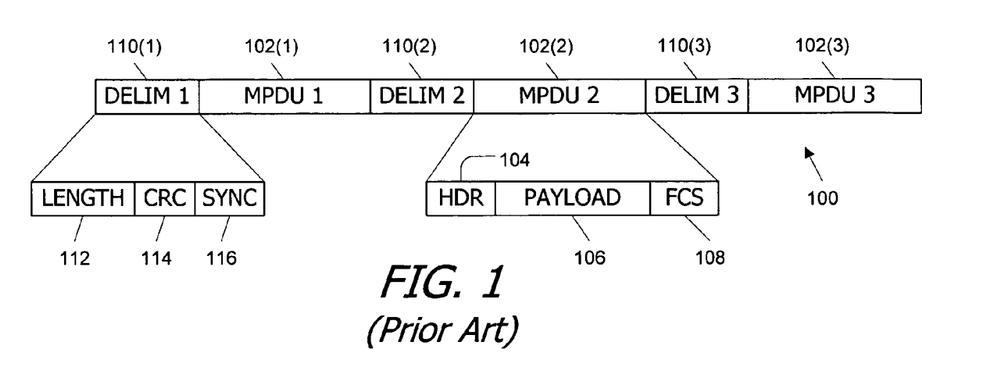
FIG. 1 illustrates a conventional physical-layer service data unit (PSDU) that transfers aggregated MAC protocol data units (MPDUs).

FIG. 1 illustrates a PSDU 100 that transfers aggregated MPDUs 102. (Herein, multiple instances of like objects are identified by like reference numerals, with parenthetical instance identifiers used where appropriate). As shown explicitly for MPDU 102(2), each MPDU 102 includes a header 104, a data-containing payload 106, and an FCS field 108. Each MPDU 102 is preceded by a corresponding MPDU delimiter 110. As shown explicitly for delimiter 110(1), each delimiter includes a length field 112, a cyclic redundancy check (CRC) field 114, and a synchronization (SYNC) field 116. Length field 112 holds a value specifying the length of the following MPDU 102. CRC field 114 holds a value usable for detecting errors in the transmission of length field 112, e.g., using a conventional checksum operation. SYNC field 116 is used to indicate the beginning of an MPDU, providing some capability for the receiver to recover from errors. While three MPDUs 110 are shown, it is to be understood that a PSDU might include any number of MPDUs and that different PSDUs may include different numbers of MPDUs.

When the receiver detects MPDU delimiter 110(1), it extracts the length information from length field 112 and validates the length information using CRC field 114, e.g., by performing a checksum operation. Assuming the length is valid, the receiver can extract the bits of the data stream that belong to the corresponding MPDU 112(1) for processing. It can then identify the start of the next delimiter 110(2) and repeat the process to extract the next MPDU 112(2), and so on.

If, however, the length validation for a delimiter, e.g., delimiter 110(1), fails, the receiver does not know the length of MPDU 112(1) and will not be able to find the start of the next delimiter 110(2). The receiver might then have to discard all the rest of PSDU 110, requiring retransmission of potentially many MPDUs.

In some instances, synchronization (SYNC) field 116 can be used by the receiver to detect the start of an MPDU 102 in cases where the length field in a previous MPDU delimiter was corrupted. For instance, suppose that length validation fails for delimiter 110(1), so the receiver does not have reliable length information for MPDU 102(1). If the receiver can detect the SYNC field 116 of delimiter 110(2), the receiver would still be able to identify the starting point of MPDU 102(2). By backtracking into the rest of delimiter 110(2), the receiver would be able to determine the length of MPDU 102(2). Thus, the rest of PSDU 100 might be recoverable. If, however, the SYNC field 116 is corrupted, the receiver would not detect the start of MPDU 102(2) and would not be able to recover the rest of the data.

When the receiver cannot locate an MPDU and cannot recover from the error, the lost MPDU and any subsequent MPDU (or in some instances the entire PSDU) must be retransmitted. Retransmission adds overhead, reducing the throughput of the network assuming that the available bandwidth remains fixed. The SYNC field provides some protection, but as noted above, a corrupt SYNC field can cause the receiver to discard most or all of a PSDU.

Therefore, it would be desirable to have aggregation techniques that would allow a higher probability of recovery of at least some of the information following a corrupted MPDU delimiter.

BRIEF SUMMARY OF THE INVENTION

Embodiments of the present invention provide techniques for extracting information-containing frames from a bitstream in which multiple frames are aggregated using frame delimiters to distinguish the frames. These techniques are capable of recovering from bit errors in a frame delimiter in at least some circumstances so that most or all of the bitstream remains usable. In some embodiments, when a frame delimiter does not provide reliable length information, an iterative attempt is made to identify the end of the corresponding frame so that this frame and any subsequent frames can be extracted. In other embodiments, the frame delimiters provide redundant copies of the length information for the frames; if one copy is corrupted, another copy may still be usable. In still other embodiments, error correction codes are provided in the frame delimiter, allowing the receiver to correct errors in the frame-length information. The use of any of these techniques may in some cases eliminate the need for conventional synchronization fields, saving some overhead.

According to one aspect of the present invention, a method for transmitting information from a transmitter to a receiver in a wireless network. A number of information-containing frames to be transmitted are defined. The frames are of variable length. For each frame, a corresponding frame delimiter is created. Each frame delimiter includes two copies of a length field containing a length value for the corresponding frame. The frames and frame delimiters are arranged into an aggregated frame such that each frame is preceded by the corresponding frame delimiter. The aggregated frame is transmitted by the transmitter to the receiver.

In some embodiments, each frame delimiter also includes two copies of a validation field associated with the length field. The validation field contains validation data (e.g., cyclic redundancy check data) usable by a receiver to validate the length field. In one embodiment, each copy of the validation field immediately follows one of the copies of the length field.

According to another aspect of the present invention, a method is provided for receiving information transmitted by a transmitter in a wireless network. A bitstream including multiple information-containing frames is received. The frames, which are of variable length, are each preceded by a corresponding frame delimiter. The frame delimiter corresponding to each frame includes a first copy and a second copy of a length value representing the length of the corresponding frame. From a first frame delimiter, corresponding to a first frame, the first copy of the length value and the second copy of the length value are extracted and compared. Corruption of the frame delimiter is detected in the event that the first copy of the length value and the second copy of the length value are not equal. If corruption is detected, a length value corresponding to one of the first copy and the second copy of the length value is selected, a candidate frame corresponding to the selected length value is extracted from the bitstream, and a frame validation test is performed on the candidate frame. In the event that the frame validation test validates the candidate frame, a bit in the bitstream subsequent to the candidate frame is identified as a first bit of a next delimiter.

In some embodiments, in the event that the frame validation test does not validate the candidate frame, a new length value, corresponding to the other one of the first copy and the second copy of the length value, is selected, and a new candidate frame corresponding to new length values is extracted from the bitstream. A frame validation test is performed on the new candidate frame. If the frame validation test validates the new candidate frame, a bit in the bitstream subsequent to the new candidate frame is identified as a first bit of a next delimiter.

In some embodiments, the frame delimiter corresponding to each frame also includes a first validation value associated with the first copy of the length value and a second validation value associated with the second copy of the length value. When one of the two length values is to be selected, the selection process can include extracting from the first frame delimiter the first validation value and the second validation value, performing a validation test on the first copy of the length value using the first validation value, and performing a validation test on the second copy of the length value using the second validation value. If one of the first copy and the second copy of the length value is validated by the validation operation, the length value corresponding to the validated one of the first copy and the second copy of the length value is advantageously selected.

According to still another aspect of the present invention, a method is provided for transmitting information from a transmitter to a receiver in a wireless network. A number of information-containing frames to be transmitted are defined. The frames are of variable length. For each frame, a corresponding frame delimiter is created. Each frame delimiter includes a length field containing a length value for the corresponding frame and an error correction field containing an error correction code (e.g., a Reed-Solomon error correction code) usable by a receiver to correct a bit error in the length value. The frames and frame delimiters are arranged into an aggregated frame such that each frame is preceded by the corresponding frame delimiter. The aggregated frame is transmitted by the transmitter to the receiver.

According to a further aspect of the present invention, a method is provided for receiving information transmitted by a transmitter in a wireless network. A bitstream including multiple information-containing frames is received. The frames, which are of variable length, are each preceded by a corresponding frame delimiter. A first frame delimiter, corresponding to a first one of the frames, includes a first length value representing the length of the first frame and an error correction code (e.g., a Reed-Solomon error correction code) pertaining to the first length value. Using the error correction code, it is determined whether the first frame delimiter is corrupted. In the event that the first frame delimiter is corrupted, the first length value is corrected based on the error correction code.

According to another aspect of the invention, a method is provided for transmitting information from a transmitter to a receiver in a wireless network. A number of information-containing frames to be transmitted are defined. The frames are of variable length. For each frame, a corresponding frame delimiter is created. The frame delimiter corresponding to a first one of the frames includes a first length field containing a length value of the first frame and a second length field containing a length value of a second one of the frames. The frames and frame delimiters are arranged into an aggregated frame such that each frame is preceded by the corresponding frame delimiter. The aggregated frame is transmitted by the transmitter to the receiver.

In one embodiment, the frame delimiter corresponding to the second frame includes a first length field containing a length value of the second frame and a second length field containing a length value of a third one of the frames. In another embodiment, the frame delimiter corresponding to a last one of the frames includes a first length field containing a length value of the last frame and a second length field containing a zero length value.

According to another aspect of the present invention, a method is provided for receiving information transmitted by a transmitter in a wireless network. A bitstream including multiple information-containing frames is received. The frames, which are of variable length, are each preceded by a corresponding frame delimiter. A first frame delimiter, corresponding to a first one of the frames, includes a first length value representing the length of the first frame and a second length value representing the length of a second one of the frames. It is determined whether a second frame delimiter, corresponding to the second frame, is corrupted. In the event that the second frame delimiter is corrupted, the second length value from the first frame delimiter cam be used to determine the length of the second frame.

According to another aspect of the present invention, a method is provided for transmitting information from a transmitter to a receiver in a wireless network. A number of information-containing frames to be transmitted are defined. The frames are of variable length. For each frame, a corresponding frame delimiter is created. Each frame delimiter includes a length field containing a length value for the corresponding frame and a validation field containing validation data usable by a receiver to validate integrity of the length field. None of the frame delimiters includes a synchronization field. The frames and frame delimiters are arranged into an aggregated frame such that each frame is preceded by the corresponding frame delimiter. The aggregated frame is transmitted by the transmitter to the receiver.

According to another aspect of the present invention, a method is provided for receiving information transmitted by a transmitter in a wireless network. A bitstream including multiple information-containing frames is received. The frames, which are of variable length, are each preceded by a corresponding frame delimiter. From a first frame delimiter, corresponding to a first one of the frames, a length value and a validation value are extracted. The validation value is used to determine whether the length value is corrupted. In the event that the length value is corrupted, a candidate frame is identified. The candidate frame consists of a first number of sequential bits in the bitstream subsequent to the first frame delimiter. A frame validation test (e.g., a cyclic redundancy check) is performed on the candidate frame. In the event that the frame validation test validates the candidate frame, a bit in the bitstream subsequent to the candidate frame is identified as a first bit of a next frame delimiter.

In some embodiments, in the event that the frame validation test does not validate the candidate frame, another candidate frame is tested. A new candidate frame is identified; the new candidate frame consists of a second number of sequential bits in the bitstream subsequent to the first frame delimiter, the second number being different from the first number. A frame validation test is performed on the new candidate frame. If the frame validation procedure validates the new candidate frame, a bit in the bitstream subsequent to the new candidate frame ending bit is identified as a first bit of a next frame delimiter.

The following detailed description together with the accompanying drawings will provide a better understanding of the nature and advantages of the present invention.

DETAILED DESCRIPTION OF THE INVENTION

Embodiments of the present invention provide techniques for extracting information-containing frames (e.g., MPDUs) from a bitstream in which multiple frames are aggregated (e.g., a PSDU). These techniques are capable of recovering from bit errors in a frame delimiter in at least some circumstances so that most or all of the bitstream remains usable. In some embodiments, when a frame delimiter does not provide reliable length information, an iterative attempt is made to identify the end of the corresponding frame so that this frame and any subsequent frames can be extracted. In other embodiments, the frame delimiters provide redundant copies of the length information for the frames; if one copy is corrupted, another copy may still be usable. In still other embodiments, error correction codes are provided in the frame delimiter, allowing the receiver to correct errors in the frame-length information. The use of any of these techniques may in some cases eliminate the need for synchronization fields, saving some overhead.

Overview

A "wireless network," as used herein, consists of two or more devices that communicate data via a wireless communication channel, e.g., using electromagnetic signaling techniques known in the art. The data may be a representation of any information, including but not limited to text, sounds, images, and/or machine-readable coded information of any kind. A device that sends data to another device is referred to herein as a "transmitter," while a device that receives data sent by another device is referred to herein as a "receiver." It is to be understood that some devices may act as both transmitters and receivers, sending and receiving data at various times. Transmitters and receivers usable to practice the present invention may be implemented using conventional technologies; a detailed description of such technologies is omitted as not being critical to the present invention.

In embodiments described herein, a transmitter transmits a bitstream, such as an 802.1-compliant PSDU, that includes multiple data-containing frames (e.g., MPDUs). As is known the art, a bitstream communicated via a wireless network is subject to various sources of error, including channel-related distortion that is imperfectly accounted for in the receiver, disruptive electrical and/or magnetic fields acting on the transmitter, receiver, and/or channel, and so on. As used herein, the term "bit error" refers generally to any instance where the receiver makes an error in decoding one or more bits of the bitstream (e.g., where "1" becomes "0" or vice versa). In addition to actual information being conveyed, the transmitted bitstream advantageously includes redundant information (also referred to herein as "validation information"), such as checksum values or error correction codes.

In embodiments described herein, the receiver uses the validation information to detect bit errors in the reconstructed bitstream, e.g., in accordance with conventional techniques. It should be noted that for many conventional validation techniques, the receiver cannot determine whether the erroneous bit(s) reside in the portion of the bitstream representing the actual information or the portion representing the validation information or both. The safest approach is to treat any information that cannot be validated as unreliable; such information is referred to herein as being "corrupted."

When corruption is detected at a point in the bitstream, the receiver initiates a recovery and/or repair procedure, the nature of which depends in part on the available validation information. "Recovery" in this context means that the receiver attempts to move past the corrupt portion of the bitstream and salvage useful information from subsequent portions. To the extent that recovery is successful, only the corrupt portion would need to be retransmitted. "Repair" in this context means that the receiver attempts to determine what bits should have been in the corrupted portion of the bitstream. To the extent that repair is successful, even the corrupt portion does not need to be retransmitted.

MPDU Recovery via Iterative Checksum

According to one embodiment of the present invention, a transmitter in an 802.11-compliant or other wireless network transmits a PSDU 100 that includes aggregated MPDUs 102, as shown in FIG. 1 and described above. Each MPDU 102 is preceded by a corresponding MPDU delimiter 110 that specifies the length of the following MPDU 102.

In a receiver, as each delimiter 110 is encountered, CRC field 114 is used to validate length field 112. If validation fails, delimiter 110 is treated as corrupted, and the receiver attempts to find a sequence of bits following the corrupted delimiter 110 that has the properties of a non-corrupted MPDU 102. Specifically, a non-corrupted MPDU 102 would include a fixed-length header 104, a variable-length payload 106, and a fixed-length FCS field 108 usable to validate the bits in payload 106. The receiver can select a portion of the bitstream following the corrupted delimiter 110 as a "candidate" MPDU and test whether the (presumed) FCS field of the candidate MPDU matches a checksum computed for the candidate MPDU. If so, the candidate is likely to be an actual MPDU. The bits following that portion can then be treated as a delimiter for the next MPDU.

Figure 2:
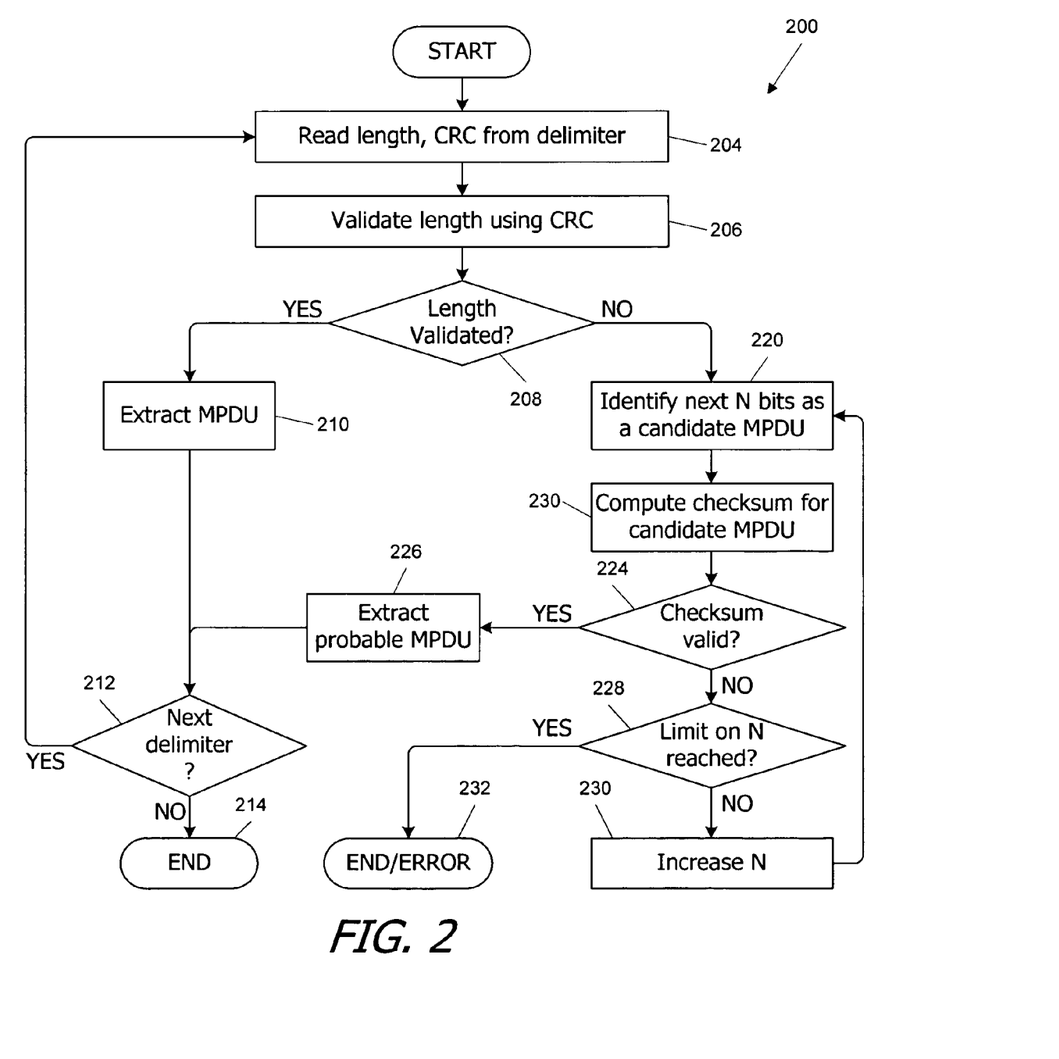
FIG. 2 is a flow diagram of a process for extracting MPDUs from a PSDU according to an embodiment of the present invention.

FIG. 2 is a flow diagram of a process 200 for processing a PSDU 100 according to an embodiment of the present invention. The receiver reads the length 112 and CRC 114 fields of a first delimiter 110 (step 204), then performs a validation operation (step 206) using the values extracted from length field 112 and CRC field 114. The validation operation may be a conventional CRC or other checksum operation; a detailed description is omitted as not being critical to understanding the present invention.

At step 208 it is determined whether the length was successfully validated. If the length was validated, the receiver extracts the corresponding MPDU 102 (step 210) using the length information. At step 212, the receiver determines whether PSDU 100 includes a next delimiter. If so, process 200 returns to step 204 to process the next delimiter; if not, process 200 exits (step 214).

If, at step 208, the length was not validated, then the delimiter 110 is corrupted. Rather than abandoning PSDU 100 as unusable, process 200 attempts to recover at least some of the data. Specifically, at step 220, the receiver identifies a number (N) of bits following the corrupted delimiter 110 in PSDU 100 as a candidate MPDU. The number N may be selected as desired; in one embodiment, the number N is initially set to a minimum size of an MPDU 102.

To test the likelihood that the candidate MPDU is in fact an MPDU 102, at step 222, the receiver computes a checksum for the candidate MPDU. For PSDU 100 of FIG. 1, each MPDU 102 ends with a fixed-length FCS field that stores a checksum value computed over the data content of the MPDU 102. The receiver may extract a presumed checksum value from the end of the candidate MPDU and compute a checksum from the remaining bits.

At step 224, the computed checksum is compared to the presumed checksum value to determine whether there is a checksum match. As is known in the art, checksum algorithms generally have the property that a checksum match is unlikely to occur in a bit sequence by accident; the exact probability of an accidental match depends on the particular checksum algorithm. Consequently, a checksum match at step 224 implies a relatively high probability that the candidate MPDU is in fact an uncorrupted MPDU 102.

Accordingly, in the event of a checksum match, the candidate MPDU is extracted from PSDU 100 (step 226) as a probable MPDU. In some embodiments, the probable MPDU is treated as any other MPDU; in other embodiments, a probable MPDU identified during the recovery procedure is treated as potentially corrupt, and the receiver may request retransmission of that MPDU or delay further processing of that MPDU pending further confirmation that the correct MPDU has been recovered. Design decisions regarding the handling of probable MPDUs are advantageously based at least in part on the likelihood of a false checksum match.

In any event, after extracting the probable MPDU, process 200 proceeds to step 212 to determine whether a next delimiter remains to be processed, as described above.

Since MPDUs have variable length, process 200 advantageously tries multiple possible lengths. Thus, if at step 224, the computed checksum for an N-bit candidate MPDU is not valid, it is determined at step 228 whether an upper limit on the number N of bits to include in an MPDU has been reached. This upper limit may be the protocol-defined maximum, or another number, as desired. If the limit has not been reached, then at step 230, the value of N is increased by a preselected amount, such as a minimum amount by which the size of an MPDU defined by the applicable standard can be changed (e.g., 8-bit byte, 32-bit word, etc., depending on the standard). Process 200 then returns to step 220 to identify and test another candidate MPDU.

Process 200 advantageously continues testing candidate MPDUs until a probable MPDU is found or until the upper limit N on MPDU size has been reached without success. When no probable MPDUs are found, process 200 advantageously ends with an unrecoverable error condition (step 232). The unrecoverable error condition may prompt the receiver to request retransmission of the entire PSDU or of the portion of the PSDU following the last successfully identified MPDU.

It will be appreciated that the recovery process of FIG. 2 is illustrative and that variations and modifications are possible. Steps described as sequential may be executed in parallel, order of steps may be varied, and steps may be modified or combined. Possible MPDU lengths N may be tested in increasing order, decreasing order, or any other order as desired.

As noted above, a probable MPDU identified during the recovery process may be used as an ordinary MPDU, or it may be discarded (with retransmission of the discarded MPDU requested as applicable). In some embodiments, when the length validation fails for one delimiter and a probable MPDU is identified, the probable MPDU is kept only if the length validation for the next delimiter succeeds. If a probable MPDU is followed by a delimiter whose length cannot be validated, it may be preferable to abandon the recovery effort, in which case the receiver would request retransmission of at least the probable MPDU and any subsequent MPDUs in the PSDU. Alternatively, if one or more possible MPDU lengths was not tested before the probable MPDU was found, an attempt to identify another probable MPDU of a different length may be made before abandoning the recovery effort.

When the length of the next delimiter after a probable MPDU is successfully validated, confidence that the probable MPDU is the correct MPDU increases as the probability of an accidental length validation decreases. In some embodiments, the decision whether to use a probable MPDU identified during recovery process 200 may be based in part on the number of uncorrupted delimiters and MPDUs that follow the probable MPDU.

It is to be understood that in cases where a length field of a delimiter is validated and an MPDU extracted, the MPDU may be further tested to detect internal corruption thereof. Conventional techniques (e.g., checksums) may be used. Validating MPDUs in the absence of delimiter corruption and any other subsequent processing of extracted MPDUs are not critical to the present invention, and a detailed description is omitted.

MPDU Recovery Using Duplicate Length Fields

Figure 3A:
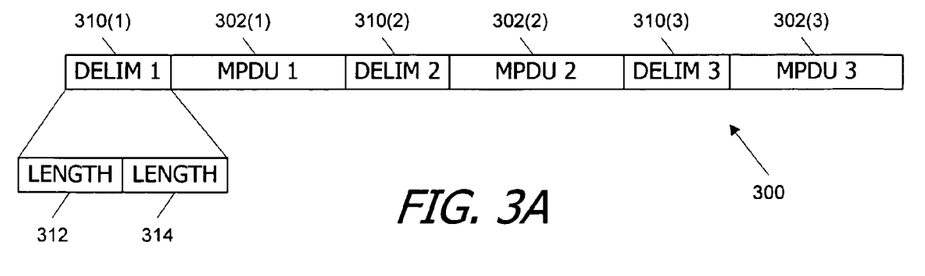
FIG. 3A illustrates a PSDU with redundant length information according to an embodiment of the present invention.

According to another embodiment of the present invention, a transmitter in an 802.11-compliant or other wireless network transmits a PSDU 300 as shown in FIG. 3A. PSDU 300 includes some number of MPDUs 302, each of which is preceded by a corresponding delimiter 310. MPDUs 302 may be generally similar to MPDUs 102 of FIG. 1. Each delimiter 310 includes two length fields 312, 314. Each length field 312, 314 in delimiter 310 stores the length of the following MPDU 302 Thus, the transmitter populates both length fields with the same value. In the embodiment shown in FIG. 3A, delimiter 310 does not include a CRC or other checksum field; those skilled in the art will appreciate that such a field could be provided if desired.

A receiver uses the two length fields 312, 314 to detect corruption in delimiter 310. If the respective length values in fields 312 and 314 are not equal to each other, then delimiter 310 is corrupted. In one embodiment, if the length values are unequal, the receiver assumes that one is correct and the other incorrect, and attempts to identify an MPDU using one of the length values.

Figure 3B:
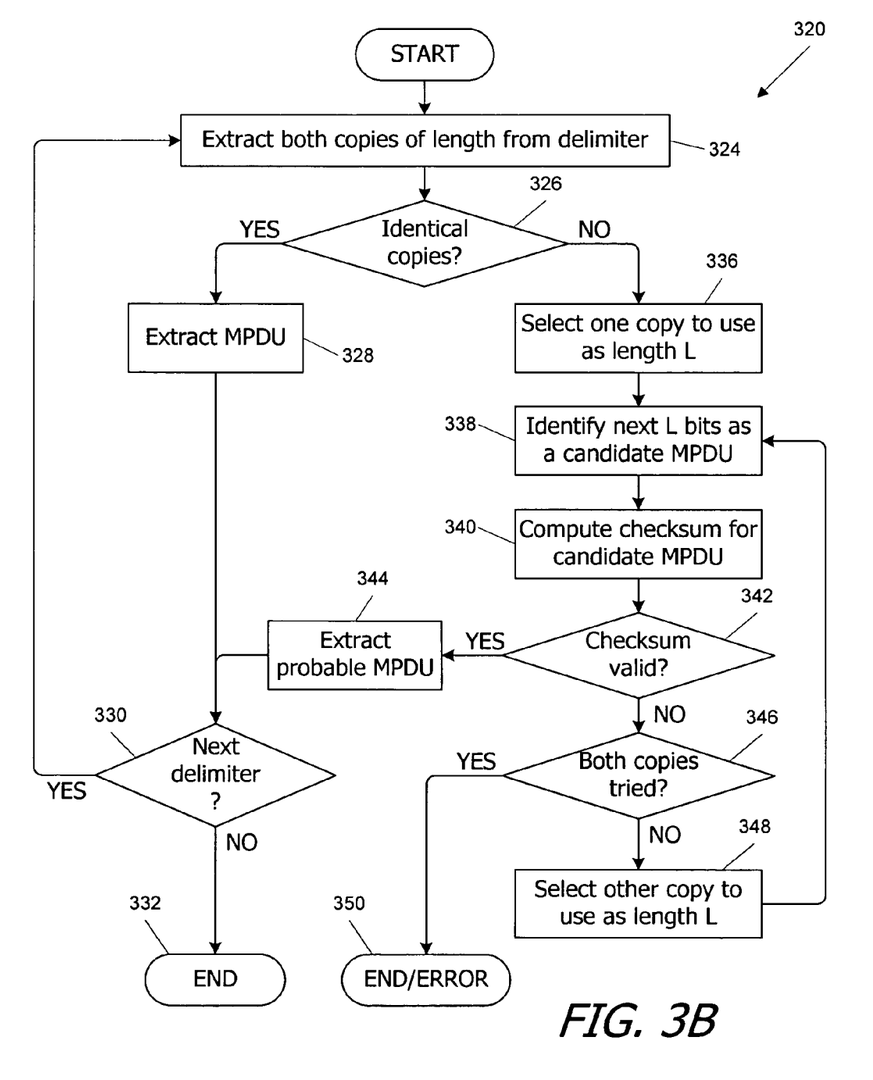
FIG. 3B is a flow diagram of a process for extracting MPDUs from the PSDU of FIG. 3A according to an embodiment of the present invention.

FIG. 3B is a flow diagram of a process 320 for processing a PSDU 300 according to an embodiment of the present invention. The receiver reads length fields 312, 314 of a delimiter 310 to extract the two copies of the length value. At step 326, the two copies are compared to each other to determine whether they are in fact identical. If so, then delimiter 310 is valid and the length value represented in either of fields 312, 314 is used to extract the corresponding MPDU 302 (step 328). At step 330, the receiver determines whether PSDU 300 includes a next delimiter. If so, then process 320 returns to step 324 to process the next delimiter; if not, then process 320 exits (step 332).

If, at step 326, the two copies of the length value are not identical, then delimiter 310 is corrupted. Rather than abandoning PSDU 300 as unusable, process 320 attempts to recover at least some of the data. In process 320, the receiver tests the assumption that only one of the two length values is in error, an assumption that is plausible given a reasonably low bit error rate.

Specifically, at step 336, the value read from one of the two copies of the length field is selected as a possible length L for an MPDU 302. In some embodiments, the first copy is selected first. At step 338, the next L bits from PSDU 300 are identified as a candidate MPDU.

To test the likelihood that the candidate MPDU is in fact an MPDU 302, at step 340, the receiver performs a checksum operation on the candidate MPDU. In one embodiment, each MPDU 302 ends with a fixed-length FCS field that stores a checksum value computed over the content of MPDU 302. The receiver may extract a presumed checksum value from the end of the candidate MPDU and compute a checksum from the remaining bits of the MPDU.

At step 342, the computed checksum is compared to the presumed checksum value to determine whether there is a checksum match. As is known in the art, checksum algorithms generally have the property that a checksum match is unlikely to occur in a bit sequence by accident; the exact probability of an accidental match depends on the particular checksum algorithm. Consequently, a checksum match at step 342 implies a relatively high probability that the candidate MPDU is in fact an uncorrupted MPDU 302.

Accordingly, in the event of a checksum match, the candidate MPDU is extracted from PSDU 300 (step 344) as a probable MPDU. In some embodiments, the probable MPDU is treated as any other MPDU; in other embodiments, a probable MPDU identified during the recovery procedure is treated as potentially corrupt, as described above with reference to FIG. 2. After extracting the probable MPDU, process 320 proceeds to step 330 to determine whether a next delimiter remains to be processed, as described above.

If, at step 342, the checksum is not valid, then process 320 advantageously determines (step 346) whether the other copy of the length value (which is already known to represent a different length) has been tested. If not, then at step 348, the other copy of the length value is selected as possible length L, and process 320 returns to step 338 to test the new value. If, at step 346, both copies have failed to produce a valid checksum, process 342 ends with an unrecoverable error condition (step 350). The unrecoverable error condition may prompt the receiver to request retransmission of the entire PSDU or of the portion of the PSDU following the last successfully identified MPDU.

It will be appreciated that the recovery process of FIG. 3B is illustrative and that variations and modifications are possible. Steps described as sequential may be executed in parallel, order of steps may be varied, and steps may be modified or combined. In some instances, it may not be necessary to test both copies of the length value. For instance, it may be possible to determine that one copy of the length field includes an invalid length value. Where this is the case, testing of that copy may be skipped.

In one alternative embodiment, if the first copy of the length value to be tested yields a candidate MPDU that has a valid checksum, it may still be desirable to test the second copy. For instance, if it is determined that the delimiter following the candidate MPDU is corrupted, it may be worthwhile to test the other copy of the length value to see whether it yields both a valid checksum and a valid following delimiter.

As with process 200 (FIG. 2) described above, any probable MPDUs identified during execution of process 320 might or might not be used as part of the data stream. In some embodiments, the decision may be based in part on whether the delimiter following the probable MPDU is also corrupted.

Figure 4A:
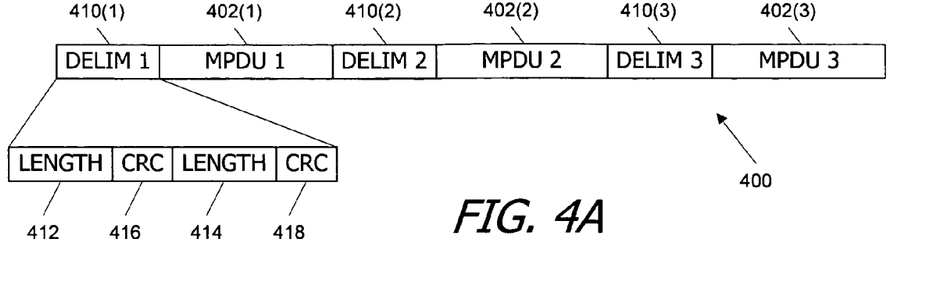
FIG. 4A illustrates a PSDU with redundant length information according to another embodiment of the present invention.

In one alternative embodiment, checksum information is provided for each of the duplicate length fields. FIG. 4A illustrates a PSDU 400 in which each MPDU 402 is preceded by a corresponding delimiter 410. Each delimiter 410 includes length fields 412, 414 and CRC fields 416, 418. Each length field 412, 414 in delimiter 410 stores the length of the following MPDU 402, and each CRC field 416, 418 stores a checksum value associated with that length. In other words, the transmitter populates both length fields 412, 414 with the same value and both CRC fields 416, 418 with the same value.

Process 320 of FIG. 3B can be used to process PSDU 400 of FIG. 4A. If, at step 326, the length fields 412 and 414 are found not to contain identical length values, CRC fields 416, 418 can be used to determine which length field is least likely to be corrupted. At step 336, that length field is advantageously chosen as the source of a length value to test.

Figure 4B:
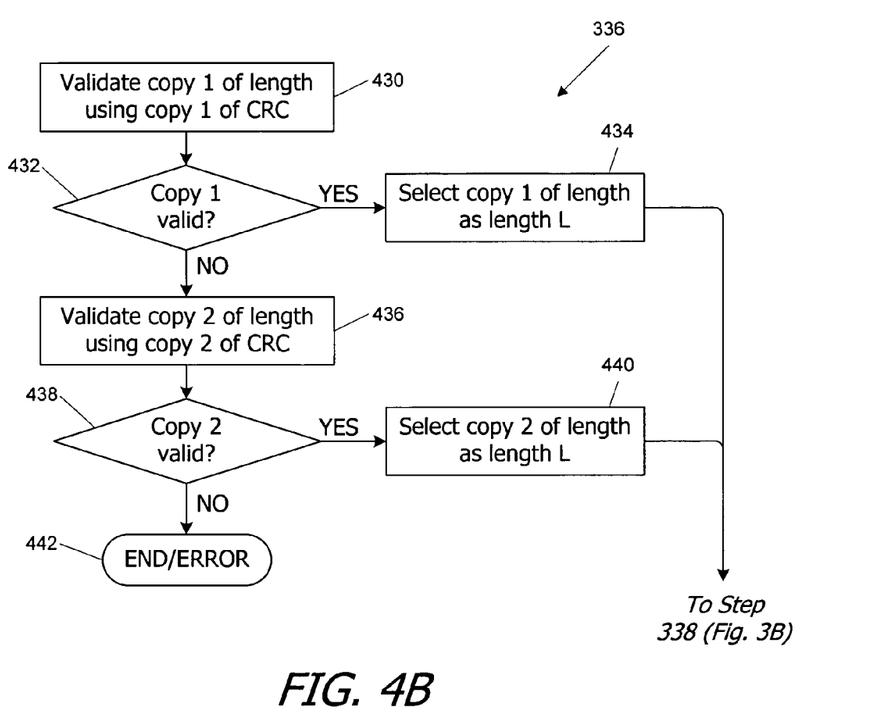
FIG. 4B is a flow diagram of a process that is usable in conjunction with the process of FIG. 3B to extract MPDUs from the PSDU of FIG. 4A according to an embodiment of the present invention.

FIG. 4B is a flow diagram of process steps that may be implemented at step 336 of process 320 of FIG. 3B according to an embodiment of the present invention. At step 430, CRC field 416 is used to validate length field 412. If, at step 432, the validation is successful, then the length value from field 412 is selected as the length L (step 434). If the validation is not successful (step 432), then at step 436, CRC field 418 is used to validate length field 414. If, at step 438, this validation is successful, then the length value from field 414 is selected as the length L (step 440). If neither length field can be validated, an unrecoverable error condition is signaled (step 442). The unrecoverable error condition may prompt the receiver to request retransmission of the entire PSDU or of the portion of the PSDU following the last successfully identified MPDU.

In other embodiments, additional tests may be tried. For instance, CRC fields 416 and 418 are expected to be identical. If they are not, then at least one CRC field is corrupted. Where this is the case, if neither length field 412, 414 is validated using its associated CRC field 416, 418, the receiver may try validating length field 412 using CRC field 418 and/or validating length field 414 using CRC field 416. Alternatively, if the length fields 412, 414 and CRC fields 416, 418 both exhibit corruption, that may be an indication of an excessive bit error rate, in which case a decision might be made to abandon the recovery attempt and signal an unrecoverable error.

Where neither length field 412, 414 can be validated using CRC fields 416, 418, the recovery attempt may be abandoned, again with an unrecoverable error condition. Alternatively, both length values might be tested using process 320 of FIG. 3B as described above.

In principle, any number of copies of the length value for an MPDU 302 of FIG. 3A (or MPDU 402 of FIG. 4A) could be included in delimiters 310 (or 410), and each copy might or might not be accompanied by a corresponding CRC field. Each copy introduces additional bits of overhead that may reduce throughput. For many applications, two copies are sufficient; however, where unusually high bit error rates are expected, the number of copies could be increased to three or even more if desired. As long as the benefit (in terms of reduced need for retransmission) outweighs the added overhead associated with the redundant information, duplicating the length information in each MPDU delimiter can provide a net performance gain.

MPDU Recovery Using Error Correction Codes

Figure 5A:
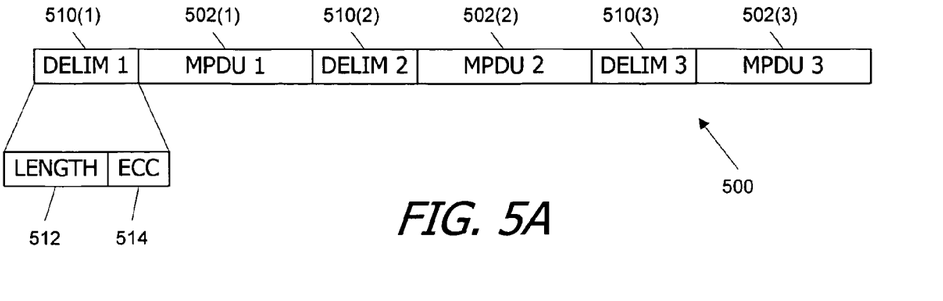
FIG. 5A illustrates a PSDU with error correction information according to an embodiment of the present invention.

According to still another embodiment of the present invention, a transmitter in an 802.11-compliant or other wireless network transmits a PSDU 500 as shown in FIG. 5A. PSDU 500 includes some number of MPDUs 502, each of which is preceded by a corresponding delimiter 510. MPDUs 502 may be generally similar to MPDUs 102 of FIG. 1. Each delimiter 510 of FIG. 5A includes a length field 512 and an error correction code (ECC) field 514. ECC field 514 is advantageously populated with a bit sequence that provides not only the ability to detect bit errors in length field 512 but also at least some ability to repair such errors. In one embodiment, conventional Reed-Solomon (RS) codes may be used to populate ECC field 514. In some embodiments, delimiter 510 also includes a CRC field (not explicitly shown) whose content is computed over length field 512 and ECC field 514.

Figure 5B:
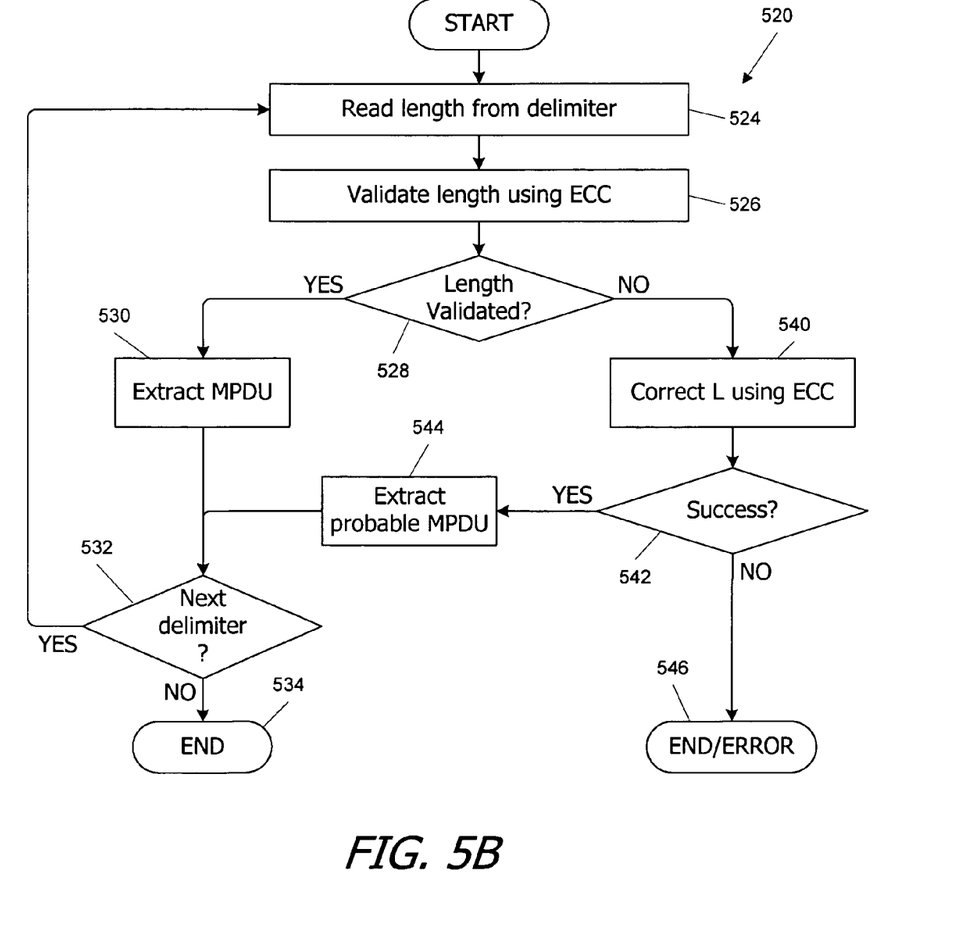
FIG. 5B is a flow diagram of a process for extracting MPDUs from the PSDU of FIG. 5A according to an embodiment of the present invention.

A receiver uses ECC field 514 to detect and correct errors in length field 512. FIG. 5B is a flow diagram of a process 520 for processing a PSDU 500 according to an embodiment of the present invention. At step 524, the length field 512 is read from a delimiter 510. At step 526, the length field 512 is validated using the content of ECC field 514. At step 528, it is determined whether the length was validated. If so, then the length value in field 512 is used to extract the corresponding MPDU 502 (step 530). At step 532, the receiver determines whether PSDU 300 includes a next delimiter. If so, then process 520 returns to step 524 to process the next delimiter; if not, then process 524 exits (step 534).

If, at step 528, the length is not validated, then at step 540, an attempt is made to correct the length field using the content of ECC field 514. The correction process and its likelihood of success depend in part on the particular ECC algorithm (e.g., RS algorithm) used. At step 542, it is determined whether the correction attempt succeeded. If so, then the corrected length value is used at step 544 to extract a probable MPDU. In some embodiments, the probable MPDU is treated as any other MPDU 502; in other embodiments, a probable MPDU identified during the recovery procedure is treated as potentially corrupt, and the receiver may request retransmission of that MPDU or delay further processing of that MPDU pending further confirmation that the correct MPDU was recovered (e.g., whether the next delimiter is valid). After extracting the probable MPDU, process 520 proceeds to step 532 to determine whether a next delimiter 510 remains to be processed, as described above.

If, at step 542, the correction attempt did not succeed, process 520 ends with an unrecoverable error condition (step 546). The unrecoverable error condition may prompt the receiver to request retransmission of the entire PSDU or of the portion of the PSDU following the last successfully identified MPDU.

It will be appreciated that the ECC-based recovery process of FIG. 5B is illustrative and that variations and modifications are possible. Steps described as sequential may be executed in parallel, order of steps may be varied, and steps may be modified or combined. Where a probable MPDU is extracted, the probable MPDU may be subjected to validation prior to proceeding any further. If the validation attempt fails, process 520 may exit with an unrecoverable error, or it may infer that the probable MPDU is corrupt and proceed to test the next delimiter.

MPDU Recovery Using Separated Length Fields

As described above with reference to FIGS. 3A and 3B, providing duplicate length fields 312, 314 in a delimiter 310 increases the likelihood that the receiver will receive at least one instance of the correct length value. Where bit errors tend to occur in bursts, it may be possible to obtain further improvement in performance by separating the two versions of the length field.

Figure 6A:
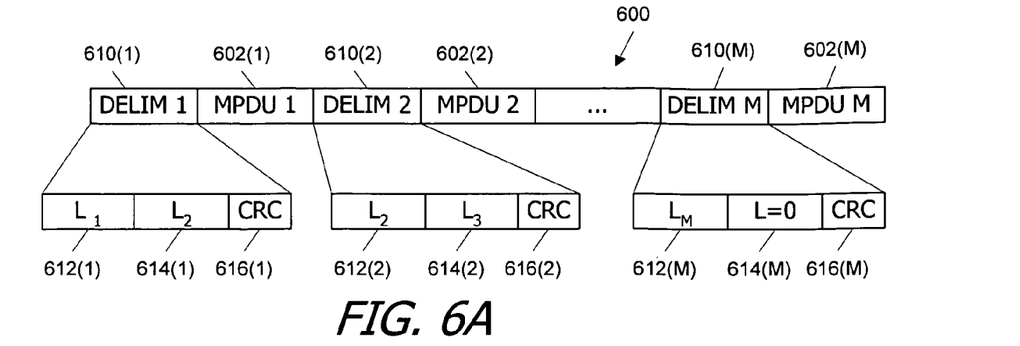
FIG. 6A illustrates a PSDU with dispersed redundant length information according to another embodiment of the present invention.

According to one such embodiment of the present invention, a transmitter in an 802.11-compliant or other wireless network transmits a PSDU 600 as shown in FIG. 6A. PSDU 600 includes some number of MPDUs 602, each of which is preceded by a corresponding delimiter 610. MPDUs 602 may be generally similar to MPDUs 102 of FIG. 1. Delimiters 610 of FIG. 6A each include two length fields 612, 614 and a CRC field 616.

Unlike length fields 312 and 314 of PSDU 300 of FIG. 3A, the length fields 612 and 614 in each delimiter 610 store lengths of two different MPDUs 602. For instance, in delimiter 610(1), field 612(1) stores the length ($L_1$) of MPDU 602(1) while field 614(1) stores the length ($L_2$) of MPDU 602(2). Similarly, in delimiter 610(2), field 612(2) stores the length $L_2$ of MPDU 602(2) while field 614(2) stores the length ($L_3$) of MPDU 602(3). Other delimiters 610 are similarly populated until the last delimiter 610(M), in which field 612(M) stores the length (LM) of MPDU 602(M) and field 614(M) stores a zero length. Each delimiter 610 advantageously includes a CRC field 616 whose content is computed based on the content of both length fields 612, 614 in that delimiter 610.

A receiver uses the CRC field 616 of a delimiter 610 to test for corruption in that delimiter 610. If the delimiter 610 is not corrupted, the receiver uses the length value in field 612 as the length for the following MPDU 602 and saves the length value from field 614 as a backup in case the next delimiter 610 is corrupted.

Figure 6B:
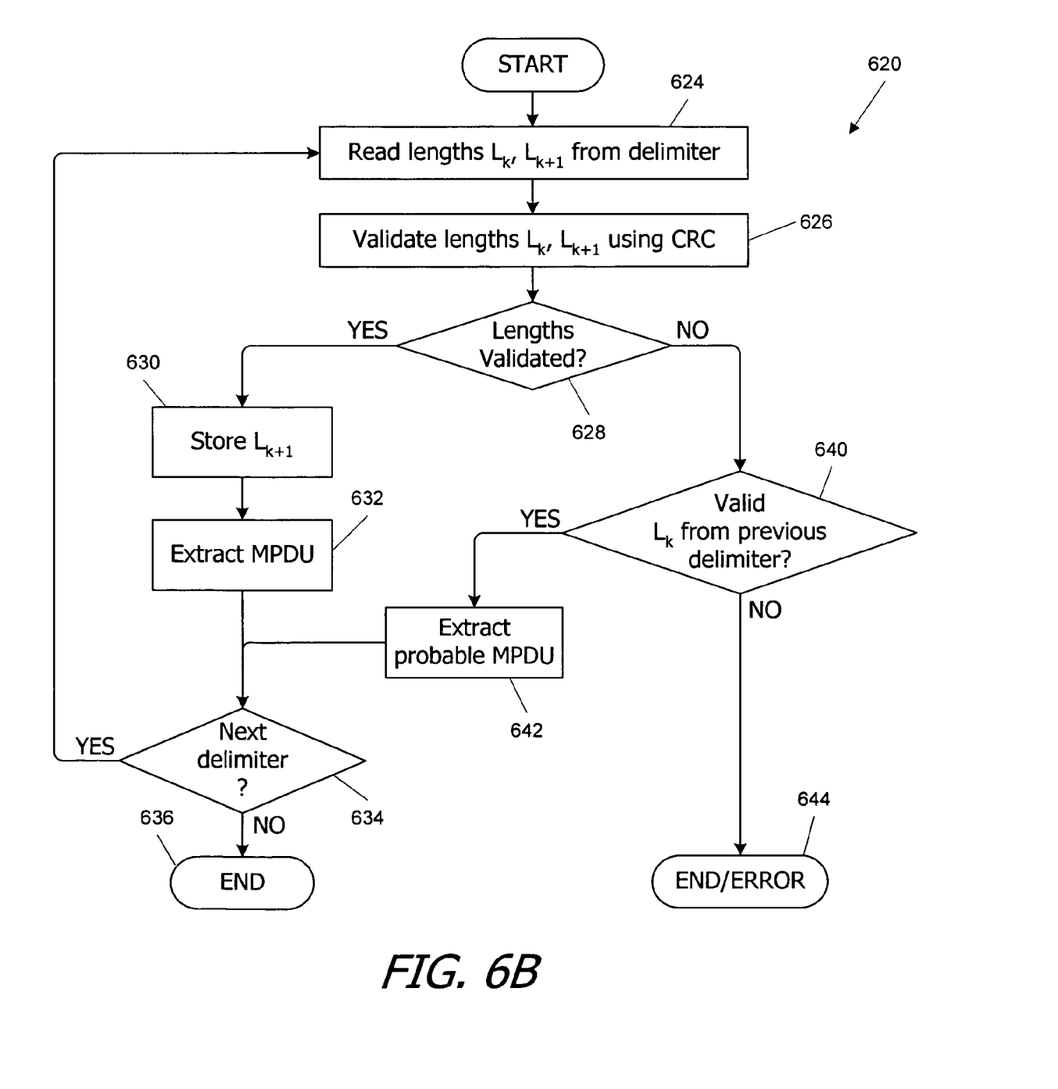
FIG. 6B is a flow diagram of a process for extracting MPDUs from the PSDU of FIG. 6A according to an embodiment of the present invention.

FIG. 6B is a flow diagram of a process 620 for processing a PSDU 600 according to an embodiment of the present invention. From a delimiter 610($k$), the receiver reads (step 624) length fields 612($k$), 614($k$) to extract respective length values $L_k$ and $L_{k+1}$ for the current MPDU and the next MPDU. At step 626, the lengths $L_k$ and $L_{k+1}$ are validated using CRC field 616($k$). At step 628, it is determined whether the validation succeeded. If so, then at step 630, length $L_{k+1}$ is stored as a backup; any appropriate memory or register unit in the receiver may be used to store length $L_{k+1}$. At step 632, the length $L_k$ is used to extract the MPDU 602($k$). At step 634, the receiver determines whether PSDU 600 includes a next delimiter. If so, then process 620 returns to step 624 to process the next delimiter; if not, then process 620 exits (step 636).

If at step 628, lengths $L_k$ and $L_{k+1}$ are not validated, then delimiter 610($k$) is unreliable. At step 640, it is determined whether a valid length $L_k$ obtained from the preceding delimiter 610($k$–1) was stored. If so, then at step 642, the stored length $L_k$ is used to extract a probable MPDU. In some embodiments, the probable MPDU is treated as any other MPDU 602; in other embodiments, a probable MPDU identified during the recovery procedure is treated as potentially corrupt, and the receiver may request retransmission of that MPDU or delay further processing of that MPDU pending further confirmation (e.g., based on validity of the next delimiter) that the correct MPDU was recovered. After extracting the probable MPDU, process 620 proceeds to step 634 to determine whether a next delimiter remains to be processed, as described above.

If, at step 640, a valid length $L_k$ was not previously stored, process 620 ends with an unrecoverable error condition (step 644). The unrecoverable error condition may prompt the receiver to request retransmission of the entire PSDU or of the portion of the PSDU following the last successfully identified MPDU.

It will be appreciated that the recovery process of FIG. 6B is also illustrative and that variations and modifications are possible. Steps described as sequential may be executed in parallel, order of steps may be varied, and steps may be modified or combined. It should be noted that PSDU 600 in this embodiment does not provide redundant length information for the first MPDU 602(1); accordingly, process 620 might not be able to recover if the first delimiter 610(1) is invalid. Thereafter, redundant information is provided for every MPDU 602, making recovery more probable.

In principle, any number of copies of the length value for a given MPDU 602 could be included in one or another of delimiters 610, with different copies being placed in different delimiters. Each copy introduces additional bits of overhead that may reduce throughput. For many applications, two copies are sufficient; however, where unusually high bit error rates are expected, the number of copies could be increased to three or even more if desired. The number of copies to include can be optimized for a particular application based on tradeoffs between overhead and the expected bit error rate.

Eliminating SYNC Fields

As noted above with reference to FIG. 1, an MPDU delimiter 110 in a conventional 802.11-compliant PSDU 100 includes a synchronization (SYNC) field 116. A receiver can use SYNC field 116 to locate the beginning of an MPDU 102 in the event that length field 112 cannot be validated or, in some cases, to confirm the beginning of MPDU 102 even when length field 112 is validated. It should be understood that, if desired, similar SYNC fields could be included in any of the PSDUs shown in FIGS. 3A, 4A, 5A and 6A.

In some embodiments of the present invention, however, SYNC fields are advantageously not included in MPDU delimiters. Where the provision of redundant length information and/or error correction codes (e.g., as described above) allows for sufficiently robust recovery from bit errors, elimination of the SYNC field may advantageously reduce overhead.

Further, process 200 of FIG. 2 provides a technique that can be used to locate MPDUs in the event of delimiter corruption without relying on SYNC fields or redundant length information. Thus, another embodiment of the present invention also allows SYNC fields 116 to be eliminated from conventional PSDU 100 of FIG. 1.

FURTHER EMBODIMENTS

As described above, MPDU delimiters used to distinguish aggregated MPDUs can include information that makes it possible for the receiver to detect and recover from corruption in the delimiter. Although each of the delimiters described above introduces some overhead (e.g., redundant copies of length information and/or error correction codes), it is expected that in many applications, the improved ability of the receiver to recover from a corrupted MPDU delimiter without requiring retransmission of an entire PSDU will result in a net increase in throughput. Further, as noted above, the redundant information may allow for removal of SYNC fields from the MPDU delimiters, in which case the net addition to overhead may be negligible.

While the invention has been described with respect to specific embodiments, one skilled in the art will recognize that numerous modifications are possible. For instance, while the invention has been described with reference to PSDUs, MPDUs and other terminology commonly associated with IEEE 802.11 standards, the invention is not limited to 802.11-compliant networks and may be used in a variety of network protocols including the forthcoming IEEE 802.11n standard.

More generally, the invention can be practiced in any wireless network in which multiple information-containing frames of variable length are aggregated prior to transmission in order to reduce overhead associated with transmitting multiple frames. Any number of frames can be aggregated, and the frames may be of any size desired. It will be recognized that the particular content of the frame is not critical to the present invention. Each frame is advantageously preceded by a frame delimiter that provides recovery and/or repair information to protect against bit errors in the frame delimiter.

Validation (error detection) may be implemented using conventional CRC algorithms, other checksum algorithms, or any other scheme by which the receiver receives information usable to detect the presence of bit errors. It is to be understood that such algorithms may occasionally fail to detect an error, as long as the error rate in validated data is acceptably low for a given application. Error correction may also be implemented using conventional error correction codes or other schemes for providing the receiver with redundant information usable to correct bit errors in at least some circumstances.

Further, various processes are described herein as potentially encountering "unrecoverable error" conditions. It should be understood that "unrecoverable" in this context merely means that the particular process that encounters such an error does not continue extracting frames after the error; unrecoverable errors advantageously occur when the likelihood of error in identifying the frames becomes unacceptably high. Where an unrecoverable error occurs in one process, the receiver may invoke a different process in an attempt to recover the frames. For example, suppose that a receiver receiving PSDUs uses one of the processes shown in FIG. 3B, 4B, 5B or 6B as a primary process for extracting MPDUs. If the primary process encounters an unrecoverable error, the receiver might invoke the iterative process at steps 220-230 of FIG. 2 to search for a likely MPDU boundary. If the process of FIG. 2 succeeds in finding a boundary, the receiver might resume use of the primary process to extract subsequent MPDUs. Alternatively, if the MPDU delimiters include SYNC fields, the SYNC fields could be used as a "fallback" for any of the recovery processes described herein.

If desired, any instances of error, corruption, or possible corruption detected during MPDU (or frame) extraction may be reported by the receiver to other data handling components; such components may use this information in any manner desired.

The various recovery processes described herein may be implemented in a particular receiver using hardware components, software components and/or any combination thereof. Similarly, the capacity to form bitstreams that include multiple frames and frame delimiters having the elements shown herein may be implemented in a transmitter using hardware, software, and/or any combination thereof.

Thus, although the invention has been described with respect to specific embodiments, it will be appreciated that the invention is intended to cover all modifications and equivalents within the scope of the following claims.

What is claimed is:

1. In a wireless communication system having a transmitter and a receiver, a method for transmitting information from the transmitter to the receiver, the method comprising:
    defining a plurality of information-containing frames to be transmitted, the frames being of variable length;
    for each of the plurality of frames, creating a corresponding frame delimiter, wherein each frame delimiter comprises two copies of a length field containing a length value for the corresponding frame;
    wherein each frame delimiter further includes first and second validation fields associated respectively with the two copies of the length field, the validation field containing validation data usable by a receiver to individually validate the copies of the length field so that one invalid copy of the length field does not prevent receiving the information-containing frame; and
    arranging the frames and frame delimiters into an aggregated frame such that each frame is preceded by the corresponding frame delimiter, wherein the aggregated frame is transmitted by the transmitter to the receiver.

2. The method of claim 1 wherein each copy of the validation field immediately follow one of the copies of the length field.

3. The method of claim 2 wherein the validation data includes cyclic redundancy check data.

4. The method of claim 1,
    wherein the frame delimiter further comprises two copies of another length field containing another length value of a second frame and corresponding validity fields of the plurality of frames and corresponding validity fields for each copy.

5. The method of claim 4 wherein the frame delimiter corresponding to the second frame further comprises two copies of an additional length field containing an additional length value of a third frame of the plurality of frames.

6. The method of claim 4 wherein a frame delimiter corresponding to a last frame of the plurality of frames comprises a copies of a further length field containing a further length value of the last frame and corresponding validity fields and comprises copies of another additional length field and corresponding validity fields containing a zero length value.

7. The method of claim 1, further comprising increasing the number of length fields and validity fields for each frame delimiter in response to determining that a retransmission avoidance benefit exists at a transmission error rate.

8. In a wireless communication system having a transmitter and a receiver, a method for receiving information at the receiver from the transmitter, the method comprising:
    receiving a bitstream including a plurality of information-containing frames, the frames being of variable length, each of the frames being preceded by a corresponding one of a plurality of frame delimiters;
    extracting from a first frame delimiter of the plurality of frame delimiters, corresponding to a first frame of the plurality of frames, first and second copies of a length value;
    detecting a first and second length field within the first field delimiters containing the length value for the first frame and detecting a first and second validity field respectively corresponding to the first and second length fields, the validation fields containing validation data usable to individually validate the copies of the length field;
    determining at least one of the first and second the length fields are valid based upon their respective validity field; and identifying a bit in the bitstream subsequent to the candidate frame as a first bit of a next frame delimiter based upon the validated length field.

9. The method of claim 1, further comprising:

receiving a bitstream including a plurality of information-containing frames, the frames being of variable length, each of the frames being preceded by a corresponding one of a plurality of frame delimiters;

extracting from a first frame delimiter of the plurality of frame delimiters, corresponding to a first frame of the plurality of frames, a length value and a validation value; using the validation value to determine whether the length value is corrupted; and in the event that both the first and second length values are corrupted:

identifying, as a candidate frame, a first number of sequential bits in the bitstream subsequent to the first frame delimiter;

performing a frame validation test on the candidate frame; and in the event that the frame validation test validates the candidate frame, identifying a bit in the bitstream subsequent to the candidate frame as a first bit of a next frame delimiter.

10. The method of claim 9 wherein the frame validation test includes:

selecting a fixed number of bits from one end of the candidate frame as validation bits representing a validation value;

computing a validation function using the bits of the candidate frame other than the validation bits; and comparing the validation function to the validation value, wherein the candidate frame is validated in the event that the validation function matches the validation value.

11. The method of claim 9 further comprising, in the event that the frame validation test does not validate the candidate frame:

identifying, as a new candidate frame, a second number of sequential bits in the bitstream subsequent to the first frame delimiter, the second number being different from the first number;

performing a frame validation test on the new candidate frame; and in the event that the frame validation test validates the new candidate frame, identifying a bit in the bitstream subsequent to the new candidate frame ending bit as a first bit of a next frame delimiter.

12. The method of claim 10 wherein the validation function is a cyclic redundancy check function.

13. The method of claim 8, further comprising:

determining that the first and second length fields can be validated with the corresponding validity field;

determining that the first and second validity fields are not identical;

determining whether the first length field can be validated with the second validity field; and determining whether the second length field can be validated with the first validity field.

14. The method of claim 8, further comprising determining that the field delimiter further comprises copies of another length field containing another length value of a second frame of the plurality of frames and corresponding validity fields for each copy.

* * * * *

UNITED STATES PATENT AND TRADEMARK OFFICE
CERTIFICATE OF CORRECTION

| | | |
|---|---|---|
| PATENT NO. | : 7,609,724 B1 | Page 1 of 1 |
| APPLICATION NO. | : 11/413953 | |
| DATED | : October 27, 2009 | |
| INVENTOR(S) | : Frederiks et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 697 days.

Signed and Sealed this

Twelfth Day of October, 2010

David J. Kappos
*Director of the United States Patent and Trademark Office*